United States Patent [19]

Mui

[11] Patent Number: 5,150,378
[45] Date of Patent: Sep. 22, 1992

[54] METHOD AND APPARATUS FOR COHERENT COMMUNICATIONS IN NON-COHERENT FREQUENCY-HOPPING SYSTEM

[75] Inventor: Shou Y. Mui, Cherry Hill, N.J.

[73] Assignee: General Electric Company, Philadelphia, Pa.

[21] Appl. No.: 772,468

[22] Filed: Oct. 7, 1991

[51] Int. Cl.⁵ .................................... H04L 27/30
[52] U.S. Cl. ........................... 375/1; 380/34
[58] Field of Search ............ 375/1; 380/33, 34

[56] References Cited

U.S. PATENT DOCUMENTS

| | | | |
|---|---|---|---|
| 4,547,887 | 10/1985 | Mui | 375/1 |
| 4,809,296 | 2/1989 | Braun et al. | 375/1 |
| 4,811,357 | 3/1989 | Betts et al. | 375/1 |
| 4,894,841 | 1/1990 | Martinino et al. | 375/1 |
| 4,914,699 | 4/1990 | Dunn et al. | 375/1 |
| 5,001,723 | 3/1991 | Kerr | 375/1 |
| 5,090,023 | 2/1992 | Watanabe et al. | 375/1 |
| 5,097,485 | 3/1992 | O'Connor et al. | 375/1 |

Primary Examiner—Salvatore Cangialosi
Attorney, Agent, or Firm—Geoffrey H. Krauss

[57] ABSTRACT

A method for using coherent modulation and coding to improve the error-rate of non-coherent frequency-hopping data transmission systems includes aiding phase estimation by sending, in each hop, one or more reference bits, which are known to the receiver, and using the reference bits along with the data bits received in that same hop to estimate the channel phase. The data bits are then demodulated using the estimaated phase. The method also uses weighting of the demodulator output during each hop by a factor expressing the confidence level for the correctness of the phase estimated for that hop. Apparatus for implementing my novel methodology is also provided.

20 Claims, 3 Drawing Sheets

METHOD AND APPARATUS FOR COHERENT COMMUNICATIONS IN NON-COHERENT FREQUENCY-HOPPING SYSTEM

BACKGROUND OF THE INVENTION

The present invention relates to electronic data communications systems and, more particularly, to a novel method and apparatus for providing coherent digital data communications in non-coherent frequency-hopping systems.

It is now well known to employ frequency hopping (sometimes referred to as "spread-spectrum") techniques to reduce any deleterious effects of single-frequency or narrow-band interference in RF communications systems. For ease of implementation, frequency synthesizers are generally not designed to maintain phase continuity between hops; and the hopping supported by such synthesizers is called non-coherent frequency hopping. Communications systems with non-coherent frequency hopping usually employ modulation techniques capable of being non-coherently demodulated, such as MFSK (M-ary frequency shift keying) and DPSK (differential phase shift keying), although it is well-known that non-coherent modulation is less efficient that coherent modulation, if efficiency is measured in terms of the ratio $E_b/N_o$ of bit energy $E_b$ to noise spectral density $N_o$ required to achieve a desired bit error rate (BER). Viterbi has theoretically shown (in "Spread Spectrum Communications—Myths and Realities", IEEE Commun. Mag., pp. 11–18, May 1979) that MFSK, for M>16 and used in conjunction with error-correction coding, is about 3 dB inferior to BPSK (binary phase shift keying) with perfect phase tracking. As reported by S. Y. Mui and J. W. Modestino, in "Performance of DPSK With Convolutional Encoding on Time-Varying Fading Channels" (IEEE Trans. on Commun., vol. COM-25, No. 10, pp. 1075–1083, October 1977), when used in conjunction with convolutional coding, BPSK outperforms DPSK and 8-ary FSK, and DPSK is only marginally better than 8-ary FSK. Therefore, in theory and assuming that the channel phase shift can be estimated accurately, the required $E_b/N_o$ ratio can be reduced by 2 to 3 dB if BPSK, instead of DPSK or MFSK, is employed in conjunction with error-correction coding. It is desirable to provide a method to use coherent BPSK modulation and convolutional coding in non-coherent frequency-hopping systems.

When data is transmitted by non-coherent frequency-hopping methods, the channel phase shift is independent from hop to hop. In order to demodulate a BPSK signal, it is necessary to estimate the channel reference carrier phase for each hop. Therefore, the key to realizing the efficiency of coherent BPSK is an effective phase estimation technique for non-coherent frequency-hopping transmissions.

The use of coherent modulation in non-coherent frequency-hopping systems could lead to bursts of channel errors. This comes about because a bad phase estimate could result in incorrect demodulation of a large fraction of the data bits transmitted within any one hop. It is well known that the performance of convolutional (Viterbi) decoders degrades if the decoder input errors are bursty. Therefore, to improve communications efficiency, it is essential to mitigate the effects of a bad channel reference carrier phase estimation on the decoder BER. It is known to use the mitigation technique of data interleaving, which acts to improve performance by breaking up bursts of errors and spreading the errors over the input sequence to the decoder.

It is desirable to provide even further mitigation of deleterious channel effects, so as to reduce the data bit error rate (BER). My invention provides, in such a communications system, a novel method and apparatus to better estimate the channel reference carrier phase in each of the plurality of successive frequency hops, as well as to weight the demodulated data output in accordance with a factor responsive to the confidence that the phase estimate for that particular hop is correct.

BRIEF DESCRIPTION OF THE INVENTION

In accordance with the invention, a novel method for reducing errors in non-coherent frequency-hopping data transmission systems includes the use of coherent modulation and convolutional coding, as well as aiding channel reference carrier phase estimation by sending, in each hop, one or more reference bits, which are known to the receiver, and using the reference bits along with the data bits received in that same hop to estimate the channel demodulation reference carrier phase. The data bits are then demodulated using a reference carrier having the estimated phase. The method also uses weighting of the demodulator output during each hop by a factor expressing the confidence level for the correctness of the phase estimated for that hop. Apparatus for implementing my novel methodology is also provided.

In a presently preferred embodiment, BPSK modulation is used, along with matched filters for recovering in-phase and quadrature-phase data samples. Specific implementations of the phase estimation and weighting functions are provided.

Accordingly, it is one object of the present invention to provide novel method and apparatus for reducing data errors in a non-coherent frequency-hopping data communications system using BPSK modulation and convolutional coding.

This and other objects of the present invention will become apparent to those skilled in the art upon reading of the following description, when considered in conjunction with the appended drawings.

DETAILED DESCRIPTION OF A PRESENTLY PREFERRED EMBODIMENT

Figure 1:
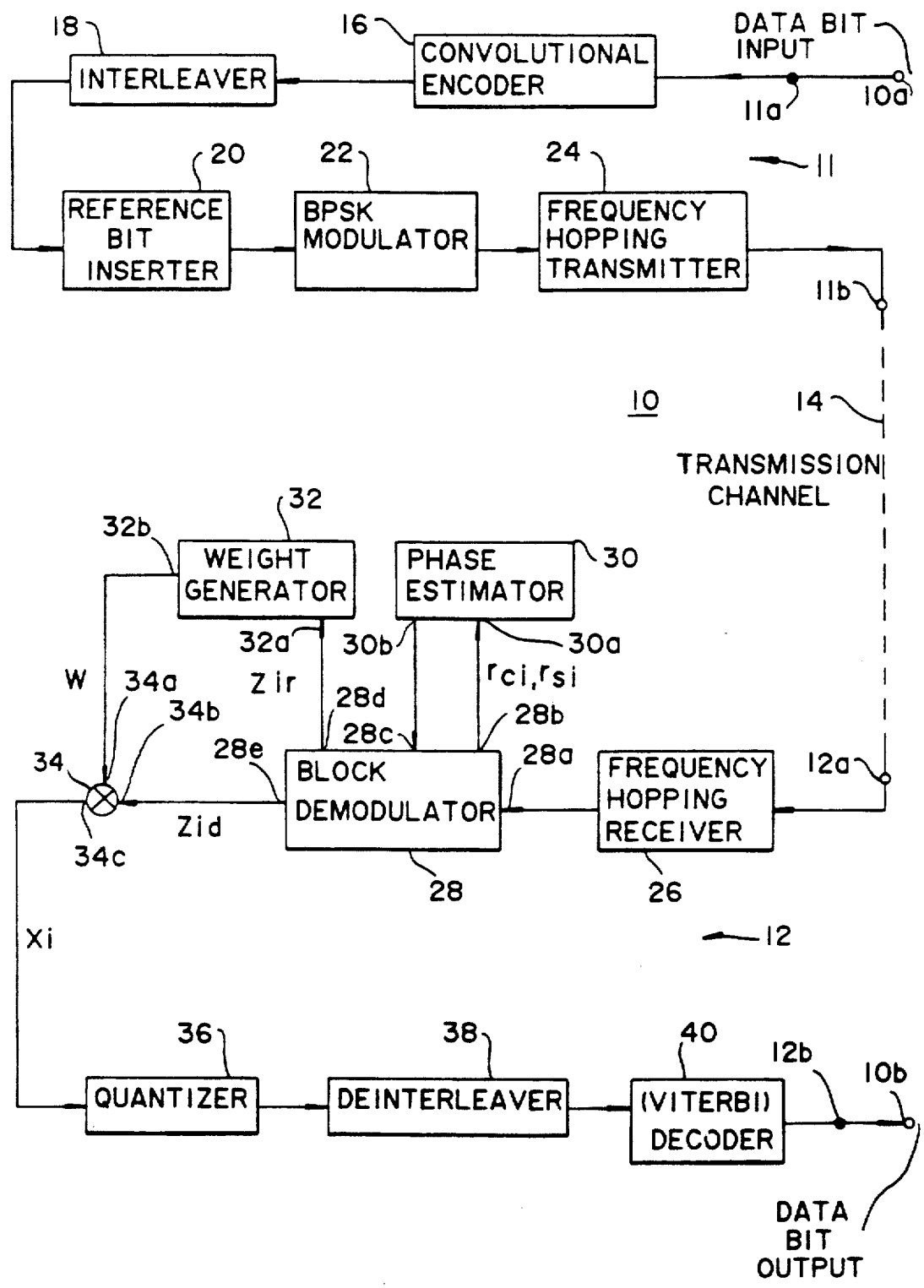
FIG. 1 is a schematic block diagram of one presently preferred data communications system in accordance with the principles of the present invention.
Figures 2, 2A:
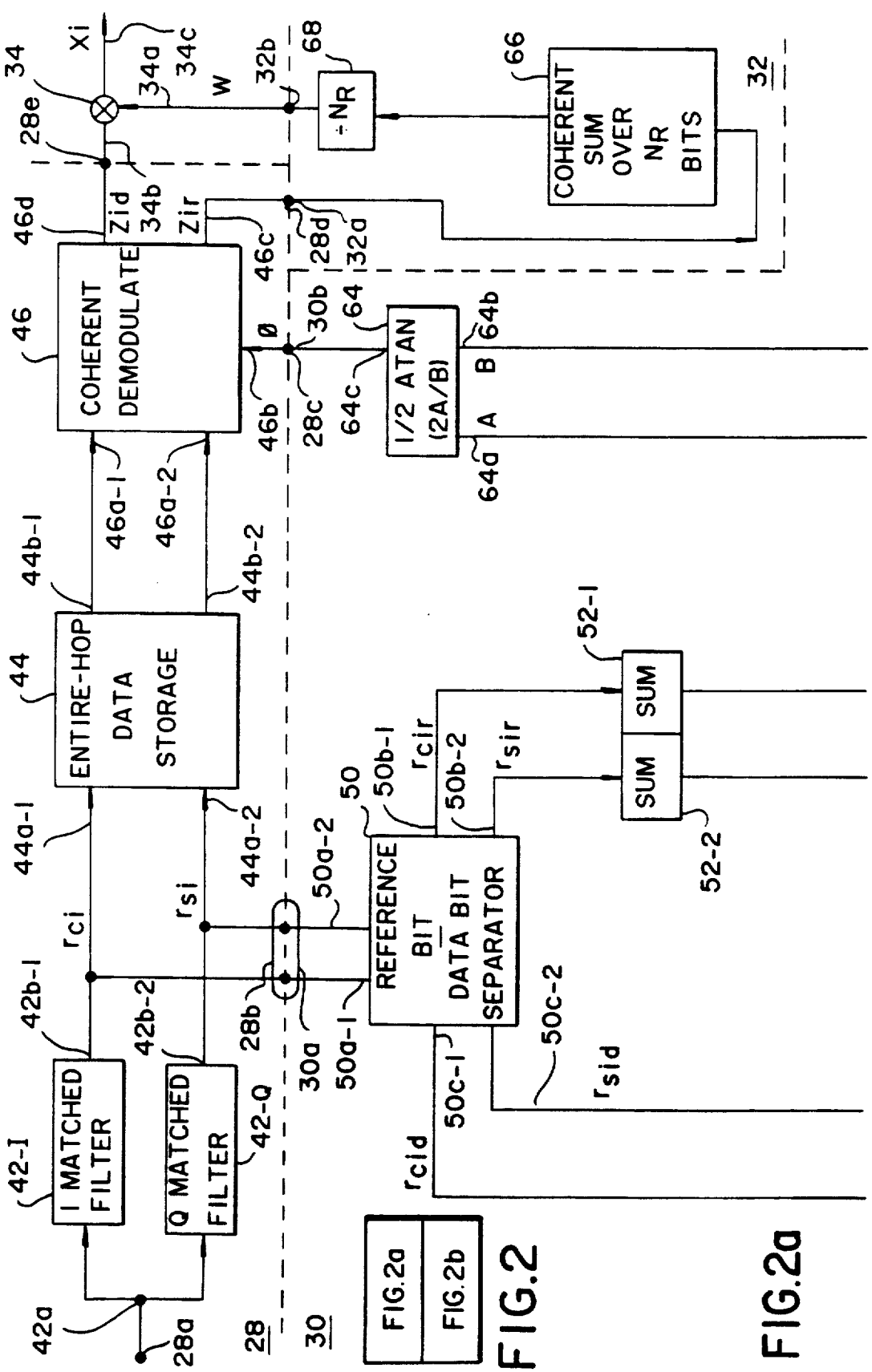
FIGS. 2, 2a and 2b are schematic block diagrams of one presently preferred embodiment of the novel block demodulator, phase estimator and weight generator of the present invention.
Figure 2B:
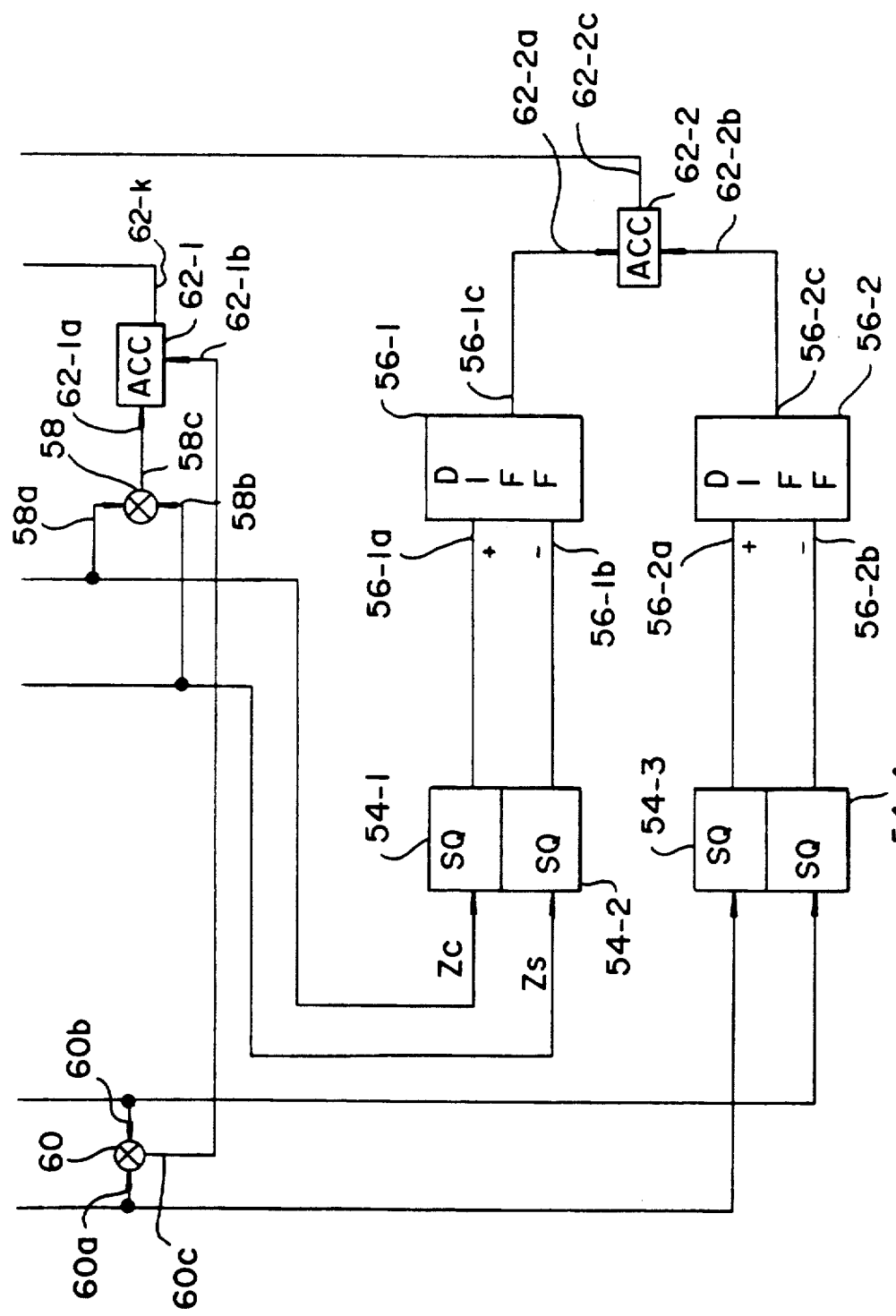

Referring now to the Figures, a digital data communications system 10 (FIG. 1) receives at an input 10a a subsequence of data bits to be transmitted to a data bit output 10b. Input 10a is connected to an input 11a of at least one system data transmitter means 11, which provides a modulated, frequency-hopped RF signal at an output 11b. Each of at least one system receiver means 12 has an input 12a receiving the RF signal from any transmitter output 11b, after transmission through a system transmission channel 14.

In the transmitter 11, the incoming data bits are first encoded for forward-error-correction and the like functions, by a convolutional encoder means 16; one possible such encoder means was described by A. J. Viterbi in "Convolutional Codes and Their Performance in Communication Systems" IEEE Trans. on Commun. Tech., vol. COM-19, No. 5, pp. 751-772, October 1971. The subsequence of encoded data bits is then coupled to an interleaver means 18; one possible interleaver is a known block interleaver employing a block of $(10/R)*N_D$ bits of memory, where R is the convolutional code rate and $N_D$ is the number of encoded data bits per frequency hop. The data bits for any one hop enter the block interleaver and are stored therein in storage space which is filled in row-by-row manner for $N_D$ rows; when the interleaver is full, the bits are read out of storage on a column-by-column basis. Bits in the same column are sent during a single frequency hop. Other interleavers may be equally as well used in place of the block interleaver. For example, either a fixed convolutional interleaver (as described by J. S. Ramsay in "Realization of Optimum Interleavers", IEEE Trans. on Inform. Th., vol. IT-6, No. 3, pp. 338-345, May 1970) or a pseudorandom convolutional interleaver (as I have described in U.S. Pat. No. 4,547,887, issued on Oct. 15, 1985) can be equally as well used. An interleaver means of larger capacity may be used if the additional delay is acceptable, while use of a smaller interleaver capacity may lead to performance degradation.

Means 20 receives the interleaved data bit subsequence and adds a subsequence of $N_R$ reference bits; this reference bit subsequence is known a priori to the receiver and is sent along with each group of $N_D$ encoded data bits making up one system hop. The reference bits may be sent as a group or distributed over the hop. For purpose of illustration, assume that a plurality of reference bits are sent, that all of the reference bits are of logic zero level and that all reference bits for each hop are sent as a group at the start of that hop.

The hop-long sequence of reference and data bits is now sent to a BPSK modulator means 22, used to modulate a frequency-hopping RF transmitter means 24. The transmitter may not maintain the same phase from hop to hop, although maintenance of substantially constant phase over any one hop is assumed.

At the receiver means input 12a, the received signal r(t) for the i-th bit of a multi-bit sequence can be represented as:

$$r(t) = \sqrt{(2E_s/T)} * \cos(2\pi f_c t + a_i \pi + \theta) + n(t)$$

for $(i-1)T < t \leq iT$, where T is the bit duration, $E_s$ is the received energy per bit, $f_c$ is the hop frequency, $a_i$ is the transmitted bit data (logic 0 or logic 1), $\theta$ is the unknown channel phase and n(t) is an additive white Gaussian noise (AWGN) with single-sided spectral density $N_o$. The energy $E_s$ of a transmitted channel bit is related to the energy $E_b$ per information bit according to $$E_s = E_b*(R*N_D)/(N_R+N_D).$$

The ratio $N_D/(N_R+N_D)$ is the loss in signal-to-noise ratio due to the transmission of reference bits.

The frequency-hopping receiver means 26 recovers each channel bit and sends that bit of data to the input 28a of a block demodulator means 28 which demodulates the incoming data on a hop-by-hop basis. The demodulator provides both an in-phase (I) matched-filter output sample $r_{ci}$ and a quadrature-phase (Q) matched-filter output sample $r_{si}$ at a first pair of outputs 28b, to the associated inputs 30a of a phase estimator means. The in-phase (I) and quadrature (Q) matched-filter outputs are calculated as:

$$r_{ci} = \int_{(i-1)T}^{iT} r(t) * \sqrt{(2/T)} * \cos(2\pi f_c t)\, dt$$

and $$r_{ci} = -\int_{(i-1)T}^{iT} r(t) * \sqrt{(2/T)} * \sin(2\pi f_c t)\, dt$$

The I and Q samples may be expressed as $$r_{ci} = \sqrt{E_s} * \cos(a_i\pi + \theta) + n_{ci}$$

and $$r_{si} = \sqrt{E_s} * \sin(a_i\pi + \theta) + n_{si}$$

where $n_{ci}$ and $n_{si}$ are independent Gaussian random variables with zero mean and variance $N_o/2$.

It is easily shown that $$r_{ci}*r_{si} = E_s/2 * \sin(2\theta) + \text{noise terms}$$

and $$r_{ci}^2 - r_{si}^2 = E_s * \cos(2\theta) + \text{noise terms}$$

The channel reference carrier phase estimate is calculated using all the reference and data bits within each hop. First, phase estimator 30 calculates the quantities $Z_c$ and $Z_s$ using the reference bit subsequence:

$$Z_c = \sum_{i=1}^{N_R} r_{ci}$$

and $$Z_s = \sum_{i=1}^{N_R} r_{si}.$$

Phase estimator 30 then calculates an estimated carrier phase $\phi$ according to:

$$\phi = \tfrac{1}{2} \tan^{-1}(2A/B)$$

where $$A = \left( Z_c * Z_s + \sum_{i=N_R+1}^{N_R+N_D} r_{ci}*r_{si} \right)$$

and $$B = \left( Z_c^2 - Z_s^2 + \sum_{i=N_R+1}^{N_R+N_D} (r_{ci}^2 - r_{si}^2) \right)$$

with the phase estimate $\phi$ having a range of $[-\pi/2, \pi/2]$. There is an ambiguity of $\pi$ radians associated with the estimate. The ambiguity is removed by using the reference bits as described hereinbelow.

The phase estimate $\phi$ is provided by the estimator output 30b to a reference carrier control input 28c of the block demodulator means, which now calculates a factor $Z_i$ as:

$$Z_i = r_{ci} \cos \phi + r_{si} \sin \phi$$

for $i = 1, 2, \ldots, N_R + N_D$. A reference subsequence factor $Z_{ir} = Z_i$, with $i = 1, \ldots, N_R$, is provided at demodulator output 28d, to the input 32a of a weight generator means 32. The weight generator assigns a weighting factor W to indicate how good the phase estimate is:

$$W = \sum_{i=1}^{N_R} Z_i / N_R.$$

The weight generator means output 32b provides the weighting factor W data to a first input 34a of a data multiplier means 34, receiving at its second input 34b the coherently demodulated data subsequence bit factors $Z_{id} = Z_i$, with $i = N_R + 1, \ldots, N_R + N_D$. The multiplier output 34c data bit $X_i$ is, for the i-th bit (again, over the data interval wherein $i = N_R + 1, \ldots, N_R + N_D$), given by $X_i = W * Z_{id}$.

The weighting factor W resolves the ambiguity of $\pi$ radians associated with the phase estimate $\phi$ and is also a measure of the confidence with which the phase ambiguity is resolved. If $|W|$ is large, then the ambiguity has probably been resolved correctly. On the other hand, if $|W|$ is small, then the phase estimation error is probably large.

The sequence of data bits $X_i$ is now quantized in a quantizer means 36, deinterleaved in a deinterleaver means 38 (complementary to the interleaver means 18 selected for use in transmitter 11) and then the deinterleaved sequence is decoded in a decoder means 40 (complementary to the encoding means 16 in the transmitter); the subsequence of recovered data bits appears at the receiver data output 12b and is coupled to the system data bit output 10b. A commercially available Viterbi decoder, such as the Q1401 device available from Qualcomm, Inc. of San Diego, CA. (which is a constraint length K = 7, rate ½ convolutional single-chip Viterbi decoder accepting an 8-level input) is preferably used for means 40, as this decoder has been shown to be nearly optimum for unweighted demodulator outputs (see: Heller and Jacobs, "Viterbi Decoding for Satellite and Space Communications", IEEE Trans. Commun. Tech., vol. COM-19, No. 5, pp. 835-848, October 1971); if this decoder is used, then quantizer means 36 must employ 8 uniform steps with a step size equal to $0.5\sqrt{(N_0/2)}$, where $N_0$ is the single-sided spectral density of the receiver noise.

Monte-Carlo computer simulation runs have been conducted to determine the BER as a function of $E_b/N_0$ for selected values of $N_D$ and $N_R$. The accuracy of the phase estimate improves with increasing $N_R$, while the loss in signal-to-noise ratio due to the transmission of reference bits goes up with $N_R$. Therefore, for a given value of $N_D$, there is a value of $N_R$ which minimizes the BER. The following table shows the optimum value of $N_R$ for selected values of $N_D$. The table also compares the performance of BPSK with that of DPSK. It can be seen from the table that BPSK outperforms DPSK by about 2.5 dB when the number of bits per hop is large, and, the loss in $E_b/N_0$ efficiency due to an imperfect phase estimate and the transmission of reference bits is less than 0.5 dB.

| | BPSK and DPSK Performance* at BER = 0.001 | | | |
|---|---|---|---|---|
| | BPSK | | DPSK | |
| $N_D$ | Best Value of $N_R$ | $E_b/N_0$ (dB) Required** | $E_b/N_0$ (dB) Required | $E_b/N_0$ (dB) Improvement of BPSK Over DPSK |
| 1 | 1 | 8.9 | 8.7 | −0.2 |
| 2 | 2 | 7.5 | 7.5 | 0 |
| 3 | 2 | 6.8 | 7.0 | 0.2 |
| 5 | 2 | 5.9 | 6.5 | 0.6 |
| 10 | 4 | 5.1 | 6.1 | 1.0 |
| 20 | 4 | 4.3 | 5.9 | 1.6 |
| 40 | 4 | 3.9 | 5.8 | 1.9 |
| 80 | 8 | 3.6 | 5.8 | 2.2 |
| 160 | 8 | 3.4 | 5.8 | 2.4 |

*Assumes constraint length 7, rate ½ convolutional code.
**For the idealized case of BPSK with perfectly known phase and no reference bit is sent, the required $E_b/N_0$ is 3.0 dB.

In accordance with one aspect of my invention, the block demodulator 28 includes in-phase (I) and quadrature-phase (Q) matched filter means 42-I and 42-Q, having a common input 42a receiving from block demodulator input 28a the receiver means 26 output. Whether known means 42 is a single or plural structure, the in-phase samples $r_{ci}$ are provided at an output 42b-1 separate from the output 42b-2 at which the quadrature-phase samples $r_{si}$ are provided. Output 42b-1 is coupled to the block demodulator output port 28b, and to a first input 44a-1 of an entire-hop data storage means 44, having a second input 44a-2 receiving the data from output 42b-2, which data is also coupled to output port 28b. Sample data enters and leaves storage means 44 (as well as most other blocks of the system) under clocked control, although the common clocks and data-ready signals are not shown herein (being somewhat dependent upon the specific circuit implementations selected by each designer for each described functional block). The stored samples are held in means 44 for a "delay" interval substantially equal to the length of time it takes for the phase estimate to be computed in means 30; the stored I samples are then made available from memory means output 44b-1 to a first (I) input 46a-1 of a coherent demodulator means 46, and the stored Q samples are made available from output 44b-2 to a second (Q) coherent demodulator input 46a-2. Means 46 can be any suitable coherent demodulator for the selected modulation type, i.e., BPSK. The coherent demodulator receives the estimated phase signal $\phi$ at another input 46b, from block demodulator means port 28c, and generates a channel reference carrier signal responsive to the estimated $\phi$ signal. Responsive to the carrier and input sample signals, and to the a priori known $N_D$ count, block demodulator means 28 provides two demodulated data bit streams: during the first $N_R$ bit time intervals, the demodulated reference factors $Z_{ir}$ are sent from coherent demodulator output 46c to means output 28d, and during the subsequent intervals for the remaining $N_D$ data bits, the demodulated data factors $Z_{id}$ are provided at output 46d, to means output 28e.

In the phase estimator means 30, the in-phase samples $r_{ci}$ appear at an input 50a-1 and the quadrature-phase samples $r_{si}$ appear at an input 50a-2 of a reference bit-data bit separator means 50, which operates to transfer, during the initial $N_R$ reference bit intervals of each sequence, the reference I samples $r_{cir}$ to an output 50b-1 and the reference Q samples $r_{sir}$ to an output 50b-2; during the remaining $N_D$ data bit intervals of each sequence, the data I samples $r_{cid}$ are transferred to an output 50c-1 and the data Q samples $r_{sid}$ are transferred to an output 50c-2. The I samples of the reference bits are coherently added, in a first SUM means 52-1 to generate the $Z_c$ data, which is then squared in a first squarer SQ means 54-1 and provided to an additive (+) input 56-1a of a first DIFF means 56-1; the Q samples of the reference bits are coherently added, in a second SUM means 52-2 to generate the $Z_s$ data, which is then squared in a second SQ means 54-2 and provided to a substractive (−) input 56-1b of the first difference DIFF means 56-1. Simultaneously, the respective $Z_c$ and $Z_s$ data are provided to the respective 58a and 58b inputs of a multiplier means 58, having its output 58c coupled to a first input 62-1a of a first accumulator ACC means 62-1, having its other input 62-1b connected to the multiplier 60 output 60c. The $Z_c$ and $Z_s$ data are processed in exactly the same manner as the I and Q samples of each data bit. The phase estimator employs the entire hop of signal, reference bits as well as data bits, for phase calculation. The $r_{cid}$ data is coupled both to the first input 60a of a multiplier means 60 and to the input of a third SQ means 54-3, while the $r_{sid}$ data is coupled both to the second multiplier input 60b and to the input of a fourth SQ means 54-4. The SQ means 54-3 output is connected to the additive input 56-2a of a second DIFF means 56-2, having a subtractive input 56-2b receiving the output of the fourth SQ means 54-4. The first DIFF means output 56-1c is connected to a first input 62-2a of second ACC means 62-2, having its other input 62-2b connected to the second DIFF means output 56-2c. The ACC means output 62-2c provides the B term input to the ATAN (arctangent) generating means 64, receiving its A term data at input 64a from the ACC means output 62-1c. Means 64 determines the phase estimate $\phi$ signal as $\frac{1}{2}$ ATAN (2A/B) and provides that data from output 64c to means output 30b and thence to the block demodulator input 28c.

The weight generator means 32 gives a weight W which is equal to the coherent sum of the demodulated reference bits (i.e. the reference bits are coherently processed and then summed in means 66 over the first $N_R$ bit intervals of each hop) divided, in means 68, by the a priori known number $N_R$ of reference bits.

While one presently preferred embodiment of my novel methods and apparatus for coherent data communications with convolutional coding in non-coherent frequency-hopping systems has been described in some detail herein, those skilled in the art will now realized that many modifications and variations can be made to my invention without departing from the spirit thereof. It is my intention, therefore, to be limited only by the scope of the appending claims and not by way of description or instrumentalities in the foregoing embodimental description.

What I claim is:

1. A method for using coherent modulation and coding in non-coherent frequency-hopping systems for digital data communication between different first and second locations, comprising the steps of:

I) transmitting an original subsequence of data bits from the first location by
  (a) convolutionally encoding the original data bit subsequence;
  (b) interleaving the encoded data into a sequential stream;
  (c) inserting a subsequence of at least one reference bit into the interleaved stream to obtain a total bit sequence; and
  (d) modulating the total bit sequence onto a non-coherently frequency-hopped RF carrier signal for transmission to at least the second location; and II) providing the original subsequence of data bits at the second location by
  (a) recovering an in-phase (I) and quadrature-phase (Q) representation of the modulating bit stream from the transmitted signal received at the second location;
  (b) estimating from the bit stream representation a phase shift of a channel reference carrier signal;
  (c) demodulating the bit stream representation, responsive to the estimated-phase channel reference carrier signal, into separate reference bit factor and data bit factor streams;
  (d) modifying the data bit factor stream by a weighting factor W indicative of a level of confidence that the channel reference carrier phase has been estimated accurately; and
  (e) reversing the interleaving and encoding processes of steps (Ia) and (Ib) for the modified data bit factor stream to output the original data bit subsequence.

2. The method of claim 1, wherein step (Ib) includes the step of block interleaving; step (Ic) includes the step of using a plurality of reference bits in a group at the beginning of each frequency hop; and step (Id) includes the step of using BPSK modulation.

3. The method of claim 1, wherein step (IIe) includes the steps of: quantizing the modified data bit stream; block deinterleaving the quantized bit stream; and convolutionally decoding the deinterleaved bit stream to extract the original data bit subsequence.

4. The method of claim 1, wherein step (IId) includes the step of multiplying each of the demodulated data bit factors obtained for any one hop by the single weighting factor W obtained by use of the reference bit factors for that hop.

5. The method of claim 4, wherein the factor W is obtained by the steps of: coherently summing the data values of stream of reference bit factors for each hop; and dividing the coherent reference factor sum by the known number of reference bits sent for each hop.

6. The method of claim 1, wherein step (IIc) includes the steps of: multiplying the respective I and Q samples of the bit stream representation respectively by cos $\phi$ and sin $\phi$, where $\phi$ is the estimated carrier phase; and summing the products.

7. The method of claim 6, further including the step of storing the I and Q samples in a particular hop until the phase estimate $\phi$ for that hop is available.

8. The method of claim 1, wherein step (IIb) includes the steps of: separating the I and Q samples during each of the data and reference subsequence intervals; processing the I and Q samples of each hop to obtain a first quantity A; processing the same I and Q samples of the same hop to obtain a second quantity B; and setting the phase estimate $\phi$ for that hop proportional to the arctangent of (2A/B).

9. The method of claim 8, wherein quantity A is obtained by the steps of: independently summing the I reference samples during a particular hop to obtain a quantity $Z_c$ and the Q reference samples to obtain a quantity $Z_s$; obtaining the product of the $Z_c$ and $Z_s$ quantities for that hop; obtaining the product for each pair of the I and Q data samples for that hop; and summing the ($N_D$+1) products, where $N_D$ is the number of data bits per hop, to obtain the quantity A for that hop.

10. The method of claim 8, wherein quantity B is obtained by the steps of: independently obtaining, during each hop, respective one quantity SQ1, one quantity SQ2, $N_D$ quantities SQ3 and $N_D$ quantities SQ4 with each SQ quantity as the square of the respective one of the $Z_c$ quantity, the $Z_s$ quantity, the I data samples and the Q data samples; obtaining during each hop a first difference as the difference between the SQ1 quantity and the SQ2 quantity; obtaining during each hop the other $N_D$ differences each as the difference between a pair of like-numbered SQ3 and SQ4 quantities; and summing the first and the other $N_D$ difference quantities for the same hop to obtain the B quantity for that hop.

11. Apparatus for coherent modulation and coding in non-coherent frequency-hopping systems for digital data communication between different first and second locations, comprising:
means for transmitting an original subsequence of data bits from the first location, and including:
means for convolutionally encoding the original data bit subsequence;
means for interleaving the encoded data into a sequential stream;
means for inserting a subsequence of at least one reference bit into the interleaved stream to obtain a total bit sequence; and
means for modulating the total bit sequence onto a non-coherently frequency-hopped RF carrier signal for transmission to at least the second location; and
means for providing the original subsequence of data bits at the second location, including:
means for recovering an in-phase (I) and quadrature-phase (Q) representation of the modulating bit stream from the transmitted signal received at the second location;
means for estimating from the bit stream representation a phase shift of a channel reference carrier signal;
means for demodulating the bit stream representation, responsive to the estimated-phase channel reference carrier signal, into separate reference bit factor and data bit factor streams;
means for modifying the data bit factor stream by a weighting factor W indicative of a level of confidence that the channel reference carrier phase has been estimated accurately; and
means for reversing the interleaving and encoding processes for the modified data bit factor stream to output the original data bit subsequence.

12. The apparatus of claim 11, wherein the interleaving means uses block interleaving; the inserting means inserts a plurality of reference bits in a group at the beginning of each frequency hop; and the modulating means uses BPSK modulation.

13. The apparatus of claim 11, wherein said reversing means includes: means for quantizing the modified data bit stream; means for block deinterleaving the quantized bit stream; and means for convolutionally decoding the deinterleaved bit stream to extract the original data bit subsequence.

14. The apparatus of claim 11, wherein said modifying means includes means for multiplying each of the demodulated data bit factors obtained for any one hop by the single weighting factor W obtained by use of the reference bit factors for that hop.

15. The apparatus of claim 14, wherein said modifying means further includes: means for coherently summing the data values of stream of reference bit factors for each hop; and means for dividing the coherent reference factor sum by the known number of reference bits sent for each hop.

16. The apparatus of claim 11, wherein said demodulating means includes: means for multiplying the respective in-phase (I) and quadrature-phase (Q) samples of the bit stream representation respectively by cos $\phi$ and sin $\phi$, where $\phi$ is the estimated carrier phase; and means for summing the products.

17. The apparatus of claim 16, further including means for storing the I and Q samples in a particular hop until the phase estimate $\phi$ for that hop is available.

18. The apparatus of claim 11, wherein said estimating means includes: means for separating the I and Q samples during each of the data and reference subsequence intervals; means for processing the I and Q samples of each hop to obtain a first quantity A; means for processing the same I and Q samples of the same hop to obtain a second quantity B; and means for setting the phase estimate $\phi$ for that hop proportional to the arctangent of (2A/B).

19. The apparatus of claim 18, wherein said quantity A obtaining means includes: means for summing the I reference samples during a particular hop to obtain a quantity $Z_c$; means for independently summing the Q reference samples during the same hop to obtain a quantity $Z_s$; means for obtaining the product for each pair of the $Z_c$ and $Z_s$ quantities for that hop; means for obtaining the product of the I and Q data samples for that hop; and means for summing the ($N_D$+1) products, where $N_D$ is the number of data bits per hop, to obtain the quantity A for that hop.

20. The apparatus of claim 18, wherein said quantity B obtaining means includes: means for independently obtaining, during each hop, respective one quantity SQ1, one quantity SQ2, $N_D$ quantities SQ3 and $N_D$ quantities SQ4 with each SQ quantity as the square of the respective one of the $Z_c$ quantity, the $Z_s$ quantity, the I data samples and the Q data samples; means for obtaining during each hop a first difference as the difference between the SQ1 quantity and the SQ2 quantity; means for obtaining during each hop the other $N_D$ differences each as the difference between a pair of likenumbered SQ3 and SQ4 quantities; and means for summing the first and the other $N_D$ difference quantities for the same hop to obtain the B quantity for that hop.

* * * * *